US007801866B1

(12) United States Patent
Kathuria et al.

(10) Patent No.: US 7,801,866 B1
(45) Date of Patent: Sep. 21, 2010

(54) SYSTEMS AND METHODS FOR READING ONLY DURABLY COMMITTED DATA IN A SYSTEM THAT OTHERWISE PERMITS LAZY COMMIT OF TRANSACTIONS

(75) Inventors: Vishal Kathuria, Woodinville, WA (US); Hanumantha Kodavalla, Bellevue, WA (US); Michael J. Zwilling, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 470 days.

(21) Appl. No.: 10/782,988

(22) Filed: Feb. 20, 2004

(51) Int. Cl.
G06F 17/30 (2006.01)
(52) U.S. Cl. ..................... 707/682
(58) Field of Classification Search ............ 707/8, 707/202, 203
See application file for complete search history.

(56) References Cited

U.S. PATENT DOCUMENTS

| | | | | |
|---|---|---|---|---|
| 5,806,074 A | 9/1998 | Souder et al. | ............ | 707/21 |
| 5,900,870 A | 5/1999 | Malone et al. | ............ | 345/333 |
| 5,933,838 A * | 8/1999 | Lomet | ............ | 707/202 |
| 6,047,291 A | 4/2000 | Anderson et al. | ............ | 707/103 |
| 6,108,004 A | 8/2000 | Medl | ............ | 345/346 |
| 6,112,024 A | 8/2000 | Almond et al. | ............ | 395/703 |
| 6,199,195 B1 | 3/2001 | Goodwin et al. | ............ | 717/1 |
| 6,240,414 B1 * | 5/2001 | Beizer et al. | ............ | 707/8 |
| 6,338,056 B1 | 1/2002 | Dessloch et al. | ............ | 707/2 |
| 6,370,541 B1 | 4/2002 | Chou et al. | ............ | 707/103 |
| 6,519,597 B1 | 2/2003 | Cheng et al. | ............ | 707/10 |
| 6,556,983 B1 | 4/2003 | Altschuler et al. | ............ | 706/55 |
| 6,578,046 B2 | 6/2003 | Chang et al. | ............ | 707/103 |
| 6,772,178 B2 | 8/2004 | Mandal et al. | ............ | 707/204 |
| 6,983,295 B1 * | 1/2006 | Hart | ............ | 707/204 |
| 2002/0091702 A1 | 7/2002 | Mullins | ............ | 707/100 |
| 2002/0152422 A1 | 10/2002 | Sharma et al. | ............ | 714/13 |
| 2002/0198891 A1 | 12/2002 | Li et al. | ............ | 707/102 |
| 2003/0061537 A1 * | 3/2003 | Cha et al. | ............ | 714/16 |
| 2004/0010499 A1 * | 1/2004 | Ghosh et al. | ............ | 707/100 |
| 2004/0024795 A1 * | 2/2004 | Hind et al. | ............ | 707/204 |
| 2005/0055445 A1 * | 3/2005 | Gupta et al. | ............ | 709/226 |
| 2008/0077636 A1 * | 3/2008 | Gupta et al. | ............ | 707/204 |

OTHER PUBLICATIONS

Mohan, C., et al., "ARIES: A Transaction Recovery Method Supporting FineGranularity Locking and Partial Rollbacks Using WriteAhed Logging," ACM Transactions of Database Systems, vol. 17, No. 1, Mar. 1992, pp. 94-162.*

(Continued)

*Primary Examiner*—Neveen Abel Jalil
*Assistant Examiner*—Farhan M Syed
(74) *Attorney, Agent, or Firm*—Woodcock Washburn LLP

(57) ABSTRACT

A "lazy commit" allows database transactions to be committed faster by not waiting for log records of the transaction to be written to disk. When a system crash occurs during the commit process, transactions may be lost because the log data is not available to recreate the transaction. While lazy commits speed up processing, they also increase the potential for data inconsistency. This invention introduces the concept of "durable reads"—transactions that require isolation from lazy commit transactions and which must be guaranteed to read only durably committed data. When durable read transaction attempts to read data changed by a lazy commit transaction, the system ensures the lazy commit transaction's changes are first made durable.

22 Claims, 7 Drawing Sheets

OTHER PUBLICATIONS

Mazzola Paluska, J. et al., "Footloose: A Case for Physical Eventual Consistency and Selective Conflict Resolution", *Proceedings of the 5th IEEE Workshop on Mobile Computing Systems and Applications*, 2003, 170-179.

Huang, Yun-Wu. et al., "Lightweight Version Vectors for Pervasive Computing Devices", *IEEE*, 2000, 43-48.

Ramsey, N. et al., "An Algebraic Approach to File Synchronization", *Software Engineering Notes, Association for Computing Machinery*, Sep. 2001, 26(5), 175-185, XP002295139.

Andrews, T. et al., "Combining Language and Database Advances in an Object-Oriented Development Environment", *OOPSLA Proceedings*, Oct. 4-8, 1987, 430-440.

Beard, et al., "Multilevel and Graphical Views of Metadata", *Research and Technology Advances in Digital Libraries*, 1998, 256-265.

Beitner, N. D. et al., "Multimedia Support and Authoring in Microcosm: An Extended Model", *Department of Electronics and Computer Science*, University of Southampton, 12 pages.

Berg, C., How Do I Create Persistent Java Objects? *Dr. Dobb's Journal*, 1997, 22(4), 98-101.

Bhattacharya, S. et al., "Coordinating Backup/Recovery and Data Consistency Between Database and File Systems", *International Conference on Management of Data and Symposium on Principles of Database Systems, Proceedings of the 2002 ACM SIGMOD International Conference on Management of Data*, 2002, 500-511.

Biliris, A., "The Performance of Three Database Storage Structures for Managing Large Objects", *ACM SIGMOD*, 1992, 276-285.

Booch, G. Benjamin/Cummings Publishing Co, "Object-Oriented Analysis and Design with Applications", 1994, 155. 156, 179-183.

Bracchi et al., "Binary Logical Associations in Data Modelling", *Modelling in Data Base Management Systems G.M. Nijssen. (ed)*; North Holland Publishing Company. 1976, 125-147.

Buneman, P. et al., Inheritance and Persistence in Database Programming Languages, *ACM*, 1986, 4-15.

Chien, A.A., "Concurrent Aggregates (CA)—Design and Experience with a Concurrent Object—Oriented Language Based on Aggregates", *J. Parallel and Distributed Computing*, 1995, 25(2), 174-196.

Chryssostomidis, Chryssosiomos, et al., "Geometric Modeling Issues in Computer Aided Design of Marine Structures", *MTS Journal*, 22(2) pp. 15-33.

"Computervision Launches Design Automation Development Platform for Windows", *PR Newswire*, Financial News, Jan. 10, 1995.

D'Andrea, A. et al., "Unisql's Next Generation Object-Relational Database Management System", *ACM SIGMOD Record*, Sep. 1996, 25(2), 70-76.

Darby, C., Object Serialization in Java 1.1. Making Objects Persistent, *WEB Techniques*, 1997, 2(9), 55, 58-59.

"Developer's Guide to Apple Data Detectors-For Version 1.0.2", © Apple Computer, Inc., 1997, 1-34.

Dietrich, Walter C., Jr., et al., "TGMS: An Object-Oriented System for Programming Geometry", *Software-Practice and Experience*, Oct. 1989, 19(10), 979-1013.

Dobashi, Y. et al, "Skylight for Interior Lighting Design", *Computer Graphics Forum*, 1994, 13(3), C85-C96.

Dorsch, Jeff, "Accel Signs with IBM to Buy Altium PCB Unit-Accel Technologies Acquires the Assets to Aitium's P-CAD Business Unit", *EDA Licensing, Electronic New*, Jan. 16, 1995, 4 pages.

Fegaras, Leonidas, "Optimizing Object Queries Using an Effective Calculus", *ACM Transactions on Database Systems*, Dec. 2000, 25(4), 457-516.

Findler, R.B. et al., Contract Soundness for Object-Oriented Languages ACM Conference on Object-Oriented Programming Systems, Languages, and Applications, *OOPSLA*, 2001, 15 pages.

Foley et al., Computer Giaphics: Principles and Practices, Second Edition, Addison-Wesley Publishing Company, 1990, Ch. 5 and 9, pp. 201-283.

Friis, A.-Christensen, et al."Geographic Data Modeling: Requirements and Research Issues in Geographic Data Modeling," Nov. 2001. *Proceedings of the 9th ACM International Symposium on Advances in Geographic Information Systems*, 2-8.

Fuh, Y-C. et al, "Implementation of SQL3 Structured Types with Inheritance and Value Substitutability", *Digital Symposium Collection*, 2000. Abstract only, 2 pages, www.acm.org/sigmod/disc/p_implementationoyostw.htm.

Garret, J.H., Jr. et al, "An Object Oriented Environment for Representing Building Design and Construction Data", *Advanced Construction Technology Center*, Jun. 1989, Document No. 89-37-04. 1-34.

Godoy Simões, M. et al, "A RISC-Microcontroller Based Photovoltaic System for Illumination Applications", *APEC 2000. Fifteenth Annual IEEE Applied Power Electronics Conference and Exposition*, Feb. 6-10, 2000, 2, 1151-1156.

Goscinski, A. "Distributed Operating Systems The Logical Design", *Addison-Wesley*, 1991, 306-313.

Harrison, C.J. et al., "Structure Editors: User-Defined Type Values and Type Inference", *IEEE*, 2000, 241-247.

Haverlock, K., "Object Serialization. java. and C++", *Dr. Dobb's Journal*, 1998, 23(8), 32, 34, 36-37.

Hay, David C, "Data Model Patterns: Convention of Thought", (Dorset House Publishing, New York, NY 1996, 47-67, 235-259.

Hernandez, M.A. et al, "The Merge/Purge Problem for Large Databases, International Conference on Management of Data and Symposium on Principles of Database Systems", *Proceedings of the 1995 ACM SIGMOD International Conference on Management of Data*, 1995, 127-138.

Hsiao, H.I. et al., "DLFM: A Transactional Resource Manager", *SIGMOD, Proceedings of the 2000 ACM SIGMOD International Conference on Management of Data*, 2000, 518-528.

Kaneko, K, et al, "Design of 3D CG Data Model of Move Animation Database System", *Advanced Database Research and Development Series*, vol. 3. *Proceedings of the Second Far-East Workshop on Future Database Systems*, 1992, 364-372.

Kaneko, K. et al., Towards Dynamics Animation on Object-Oriented Animation Database System Move. *Advanced Database Research and Development Series*, vol. 4, *Database Systems for Advanced Applications* 1993, 3-10.

Katz, R.H., "Toward a Unified Framework for Version Modeling in Engineering Databases", *ACM Computing Surveys*, 1990, 22(4), 375-408.

Kawabe, S. et al, "A Framework for 3D Modeling Constraint-Based Description and Non-Manifold Geometric Modeling", *A Collection of Contributions based on Lectures Presented at the 2d Toyota Conference, Organization of Engineering Knowledge for Product Modelling in Computer Integrated Manufacturing*, Japan, Oct. 2-5, 1988, 325-357.

Kempfer, L., "CAD Jumps on Windows 3.1 Bandwagon", *Computer Aided Engineering*, 1993, 24-25.

Khan, L. et al, A Performance Evaluation of Storing XML Data in Relational Database Management Systems, *WIDM*, 2001, 31-38.

Khoshafian, S. et al, "Object Identify". *OOPSLA'86*. 1986, 21, 406-416.

Kiesling, R., "ODBC in UNIX Environments", *Dr. Dobb's Journal*, Dec. 2002, 27(12), 16-22.

King et al, "TriStarp- An investigation into the Implementation and Exploitation of Bunary relational Storage Structures", *Proc. 8.sup.th BNCOD(British National Conference On Data Bases)*, pp. 64-84 (York 1990).

Krouse, J.K., "Geometric Models for CAD/CAM", *Machine Deisgn*, Jul. 24, 1990, 99-105.

LeBlanc, Andrew R., et al. "Design Data Storage and Extraction Using Objects", *Concurrent Engineering: Research and Applications*, 1993, 1, 31-38.

Leontiev, Y. et al, "On Type Syst:sms for Object-Oriented Database Programming Languages", *ACM Computing Surveys*, Dec. 2002, 34(4), 409-449.

Lim, J.B. et al, "Trnasaction Processing in Mobile, Heterogeneous Database Systems", *IEEE Trans. on Knowlegde and Data Engineering*, 2002,14(6), 1330-1346.

Mallet, S. et al., "Myrtle: A set-Oriented Meta-Interpreter Driven by a Relational Trace for Deductive Databases Debugging", *Lecture Notes in Computer Science*, 1999, 1559, 328-330.

Mariani, J. A., Oggetto: "An Object Oriented Database Layered on a Triple Store", *The Computer Journal*, 1992, 35(2),108-118.

McMahon, L.E, "SED-A Non-Interactive Text Editor", Bell Laboratories, Aug. 15, 1978, 10 pages.

"Mechanical Design Software (Buyers Guide)", *Computer-Aided Engineering*, Dec. 1993, 12(12), 32-36.

Melton, J. et al, "SQL and Management of External Data", *SIGMOD Record*, Mar. 2001, 30(1), 70-77.

Mitchell, W.J., "The Logic of Architecture", *Massachusetts Institute of Technology*, 1990, 139-143.

Navathe, S.B., "Evolution of Data Modeling for Databases," *Communications of the ACM*, Sep. 1992, 35(9), 112-123.

Nelson, M. et al, "Generic Support for Caching and Disconnected Operation", *4th Workshop on Workstation Operating Systems*, Oct. 1993, 61-65.

Nijssen, G.M. et al., "Conceptual Schema and Relational Database Design, A Fact Oriented Approach", *Department of Computer Science, University of Queensland, Prentice Hall*, 10-33, 42-43, 48-51, 156-170.

Oracle 9i SQL Reference, Release 2 (9.2). Mar. 2002, 13-89 to 13-90.

Orenstein, J, et al, "Query Processing in the Object Store Database System", *ACM SIGMOD International Conference on Management of Data*, Jun. 1992, 21(2),403-412.

Ottogalli, F.G. et al., "Visualisation of Distributed Applications for Performance Debugging", *Lecture Notes in Computer Science*, Jan. 2001, 2074, 831-840.

Pachet, et al, "A Combinatorial Approach to Content-Based Music Selection", *Multimedia Computing and Systems*, Jun. 7, 1999, 457-462.

Papiani, M. et al, "A Distributed Scientific Data Archive Using the Web, XML and SQL/MED", *SIGMOD Record*. Sep. 1999, 28(3), 56-62.

Powell, M., "Objected References, Identifiers, and Equality White Paper", (Jul. 2, 1993), *OMG TC Document 93.7.5*, 1-24.

Prosise, J., "2-D Drafting: Why Pay More?". *PC Magazine: The Independent Guide to IBM-Standard Personal Commiting*, 1993, 12(4), 255-289.

Reiner, A. et al., "Benefits of X-based Three-Tier Client/Server Model with ESRI Applications", *Virtual Solutions*, 1995, 9 pages.

Read, III, B.C., "Developing the Next Generation Cockpit Display System", *IEEE Aerospace and Electronics Systems Magazine*, 1996, 11(10), 25-28.

Rouse, N.E., "CAD Pioneer are Still Trailblazing" , *Machine Design*, Oct. 22, 1987, 59(25),117-122.

Roussopoulos, N. et al., "Using Semantic Networks for Data Base Management", *Proceedings of the 1st Supplemental VLDB Conference*, 1975, 144-172.

Santos, J.L.T. et al., "Computer Aided Mechanical Engineering Design Environment for Concurrent Design Process", *Proceedings of the 1993 ITEC Workshop on Concurrent Engineering*, May 4-6, 1993, Simulation in Concurrent Engineering, 71-83.

Seshadri, P., "Enhanced Abstract Data Types in Object-Relational Databases", *The VLDB Journal, The International on Very Large Databases*, 1998, 7, 130-140.

Simon, A.R., *Strategic Dataoase Technology: Management for the Year 2000*, 1995, pp. 6-9, 14-17, 55-57, Morgan Kaufmann Publishers.

Sreenath, N., "A Hybrid Computation Environment for Multibody Simuiation", *Mathematics and Computers in Simuiation*, 1992, 121-140.

Signhal, A. et al., "DDB: An Object Design Data Manager for VLSI CAD", *Association for Computer Machinery*, 1993, 467-470.

Stevens, T., "Value in 3-D" *Industry Week*, Jan. 8, 1995, 45-46.

Stonebraker, M., "The Case for Partial Indexes", *SIGMOD Record*, 1989, 18(4), 4-9.

Strickland, T.M., "Intersection of Relational and Object", *Proceedings of the AM/FM International Conference XVII*, Mar. 14-17, 1994, 69-75.

Sutherland, J. et al., "The Hybrid Object-Relational Architecture (HORA), An Integration of Object-Oriented and Relational Technology", *Applied Computing: States of the Art and Practice*, 1993, 326-333.

Suzuki, H. et al., "Geometric Modeling for Modeling Products", *Proceedings of the Third international Conference on Engineering Graphics and Descriptive Geometry*, Jul. 11-16, 1988, Vienna Austria. 2, 237-243.

Sreekanth, U. et al., "A Specification Environment for Configuring a Discrete-Part Manufacturing System Simulation Infrastructure", *International Conference on Systems, Man and Cybernetics*, Oct. 17-20, 1993, 1, 349-354.

Taylor, R.H. et al., "An Integrated Robot System Architecture", *Proceedings of the IEEE*, Jul. 1983, 71(7), 842-856.

Varlamis I. et al., "Bridging XML-Schema and Relational Databases. A System for generating and Manipulating Relational Databases using Valid XML Documents", *DocEng' Ol*, Nov. 9-10, 2001.

Wilcox, J., "Object Databases-Object Methods in Distributed Computing", *Dr. Dobbs Journal*, Nov. 1994, 19(13), 26-34.

Watanabe, S., "Knowledge Integration for Architectural Design", *Knowledge-Based Computer-Aided Architectural Design*. 1994, 123-146.

Waugh, A., "Specifying Metadata Standards for Metadata Tool Configuration", *Computer Networks and ISDN Systems*, 1998, 30, 23-32.

Wold, E. et al., "Content-Based Classification, Search, and Retrieval of Audio", *IEEE Multimedia, IEEE Compuler Society*, 1996, 3, 27-36.

Yoshikawa, M. et al.. "XRel: A Path-Based Approach to Storage and Retrieval of XML Documents Using Relational Databases", *ACM Transactional on Internet technology*, Aug. 2001, 1(1), 110-141.

\* cited by examiner

Clearing the bit on a Marked Page

SYSTEMS AND METHODS FOR READING ONLY DURABLY COMMITTED DATA IN A SYSTEM THAT OTHERWISE PERMITS LAZY COMMIT OF TRANSACTIONS

TECHNICAL FIELD

The present invention relates generally to database transactions, and more particularly, to enabling efficient "durable read" capabilities to enable proper isolation of transactions from the effects of lazy commit transactions in a data base system that utilizes a transaction log to ensure data consistency in the event of an unexpected system interruption and allows "lazy commits."

BACKGROUND

A "lazy commit" allows database transactions to be committed faster by not waiting for log records of the transaction to be synchronously written to disk. When a system crash occurs, transactions may be lost because the log records are not available to redo the transaction. For certain applications, that is acceptable because these applications can recreate the transactions after resumption from a crash. While lazy commits speed up processing for this class of applications, they also create the potential for data inconsistency in case another application reads "lazily committed" changes from a first store and updates a second store based on that data. In the event of a crash, the changes in the first store might be lost, leaving the first store and the second store in an inconsistent state. What is missing in the art is an efficient means for certain transactions to conduct "durable reads"—that is, read only "durably committed" data, to isolate their processing from that of a lazy commit transaction to eliminate the possibility of the above-mentioned inconsistency. The present invention provides a solution.

SUMMARY

Various embodiments of the present invention enable "durable reads" for transactions that require isolation from the effects of lazy commit transactions and which must be guaranteed to read only durably committed data. When a durable read transaction attempts to read data changed by a lazy commit transaction, the system ensures the lazy commit transaction's changes are first made durable.

In one embodiment of the present invention, a data page is marked (as "not durable") after a "lazy commit" transaction makes changes to the data page. Then, when a second transaction seeking to obtain durable data from the changed data page determines that the data page is marked (that the data is not durable), the transaction causes the log to immediately flush to the disk so that the commit log entry that pertains to the "lazy commit" transaction that modified the data page becomes a durable log entry. The transaction also causes the "lazy commit" transactions that have not yet committed but which might have modified the page to flush their transaction log entries to disk whenever they commit. The data page is then unmarked (immediately or at a later point in time) and the data, now durable (because of flushing the log entry to the persistent data store), is read from the data page by the durable read transaction.

BRIEF DESCRIPTION OF THE DRAWINGS

The foregoing summary, as well as the following detailed description, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION

The subject matter is described with specificity to meet statutory requirements. However, the description itself is not intended to limit the scope of this patent. Rather, the inventors have contemplated that the claimed subject matter might also be embodied in other ways, to include different steps or elements, or combinations thereof, similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Computer Environment

Figure 1:
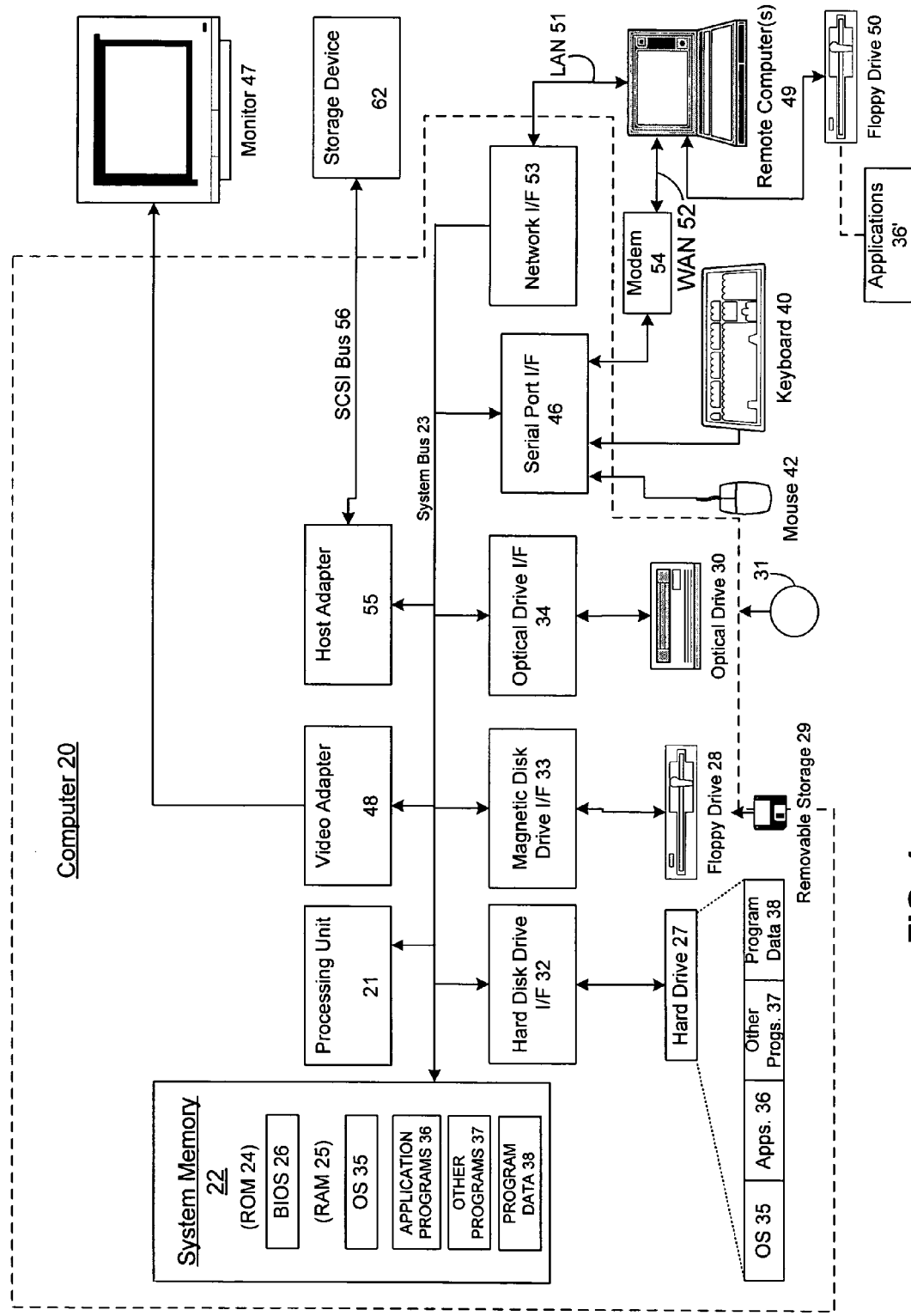
FIG. 1 is a block diagram representing a computer system in which aspects of the present invention may be incorporated.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

While it is envisioned that numerous embodiments of the present invention are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

Transactions

In regard to databases and other information storage structures, a transaction is a sequence of information exchanges and related work that are treated as a single unit for purposes of satisfying a request and for ensuring database integrity. In order to ensure integrity, a transaction is deemed complete or "committed" only when the transaction commit is recorded in a transaction log that is written to a persistent data store. This commit log record is written to the persistent data store prior to the changed data resulting from the transaction being written to the persistent data store. Should something happen after the transaction is committed but before the data resulting from the transaction is successfully recorded to the persistent data store—that is, before the data itself is stored in the persistent data store, but after the commit log has been recorded to the data store—changes recorded in the log can be used to bring the data in the data store up to date to a state corresponding to that reflected in the transaction log.

A transaction manager is a program/component that manages or oversees the sequence of events that comprise a transaction. Transactions are supported by Structured Query Language (SQL), the standard user and programming interface for databases. The four primary attributes for any transaction made by a transaction manager are atomicity, consistency, isolation, and durability (ACID). For a transaction involving two or more discrete pieces of information, atomicity is the requirement that all pieces of information must be committed in order for the transaction itself to be deemed committed; otherwise, a transaction is deemed uncommitted. To ensure consistency, a transaction either creates a new and valid state of data, or, if any failure occurs, returns all data to its state before the transaction was started. A transaction in process and not yet committed must remain isolated from any other transactions. Finally, committed data must be saved by the system such that, even in the event of a failure and system restart, the data is available in a correct state. The ACID concept is described in ISO/IEC 10026-1:1992 Section 4, and each of the ACID attributes is generally measured against a benchmark.

Figure 2:
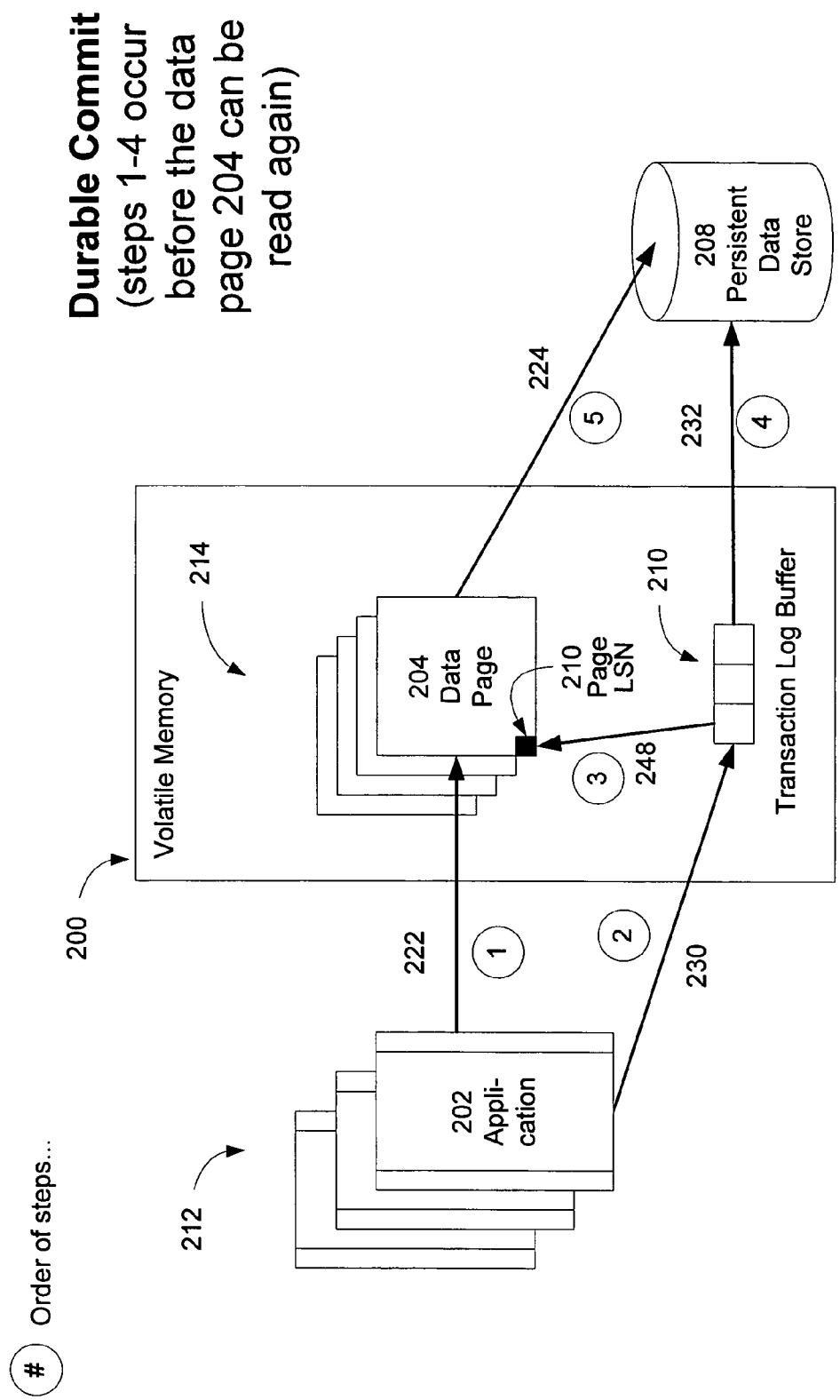
FIG. 2 is a block diagram illustrating the metaphorical framework for one embodiment of a strong ACID-based transaction manager system employing a "durable commit" strategy.

FIG. 2 is a block diagram illustrating the metaphorical framework for one embodiment of a strong ACID-based database system employing a "durable commit" strategy. An application 202, which may be just one from among a plurality of applications 212, makes changes 222 to a data page 204 (step 1), which may be one from among a plurality of data pages 214 in volatile memory 200. These changes to the data page 204 are part of a transaction (not shown) that are not immediately written 224 to the persistent data store 208. Instead, the updated data pages 204 are written 224 at a later point, on certain occasions, to the persistent data store 208. Of course, if there is a system crash, these changes would be lost since they are not reflected in the data store 208; therefore, the data manager also maintains a transaction log (not shown) in the data store 208.

For every change that is written to any of the data pages 214, a corresponding log record describing the change is written 230 to the transaction log buffer 210 (step 2). Every log record generated is given a sequence number referred to as a Log Sequence Number (LSN). This LSN is also written 248 to the data page 204 in an attribute called Page LSN 250 (step 3). Page LSN means the LSN of the last log record corresponding to the last change made to the page.

When the transaction is requested to be committed by the application 202, a commit log record (not shown) is written to the transaction log buffer 210. Then the transaction log buffer 210 is then written 232 to the persistent data store 208 (step 4) before the commit request is considered completed. It is the writing of the commit log record to the persistent data store 208 that ensures the durability of the changes made as part of this transaction. Then, at a later point, the data page 204 is itself written 224 to the persistent data store 208 (step 5).

At any point, should the computer system crash and subsequently reboot, some changes to the data pages may not have not written to the persistent data store (step 5) at the time of the crash although the corresponding commit log entry was so written (step 4). The data manager, referencing the transaction log in the persistent data store, can determine the present state of the durable data by ascertaining which transactions were committed and which were not. After determining which transactions were committed and which data pages do not have the changes corresponding to those transactions, the data manager re-applies the changes described in the transaction log to those data pages and then writes them to the persistent data store. This makes sure that none of the changes to data pages performed by an application in context of a committed transaction are lost in case of a crash. Therefore, a transaction is considered to be committed if a log entry has been flushed to the data store regardless of whether the actual data page is actually stored in the data store before a crash or other such events.

While this approach provides a means for ensuring strong data consistency, the required serial and synchronous writes of transaction log to the persistent data store are extremely time-consuming and resource costly. The durability of a transaction is achieved by flushing the transaction log buffer 210 to the transaction log in the persistent data store 208 at the time of transaction commit. However, this flushing is quite expensive because most persistent data stores have high latency and low throughput.

Lazy Commit

An alternative to the durable commit approach is the "lazy commit" approach. Applications can achieve significant performance, latency, and throughput improvements by indicating to the data manager that the immediate durability of the committed transactions in the event of a crash is not a requirement for them. This would allow these applications to commit a larger number of transactions in a given amount of time than would have been otherwise possible.

There are many applications where the durability (out of Atomicity, Consistency, Isolation, Durability) of a transaction in the event of a crash is not required by an application but the performance is very important. The examples of such applications include 1. Data Warehousing
2. Queue Processing
3. Bulk Load These applications are designed such that, after resuming from a crash, they can reconstruct the transactions that were lost due to the use of lazy commit (followed by system crash). For example, bulk load can store the current location in the input file up to which the data has been loaded into the database, as part of the transaction that is inserting the data. If some of the transactions were lost because of a system crash, the file position stored in the database would indicate the location from which the data should be loaded from the input file. Hence, for bulk load, "lazy commit" provides significant performance gains and there is no loss of data in case of system crash.

However, while this lazy-commit approach provides a more efficient means for conducting transactions and ensuring fairly strong data consistency (it provides Atomicity, Consistency, Isolation, and delayed Durability), one serious shortcoming of this method is that it allows other applications to read and operate on data that has been modified by a committed transaction but which might not yet be durable, that is, where the corresponding commit log record in the transaction log buffer has not yet been flushed to the persistent data store (step 4); consequently, if the system crashes before the corresponding entry in the transaction log is flushed to the data store, an inconsistency can result in certain specific situations.

Figure 3:
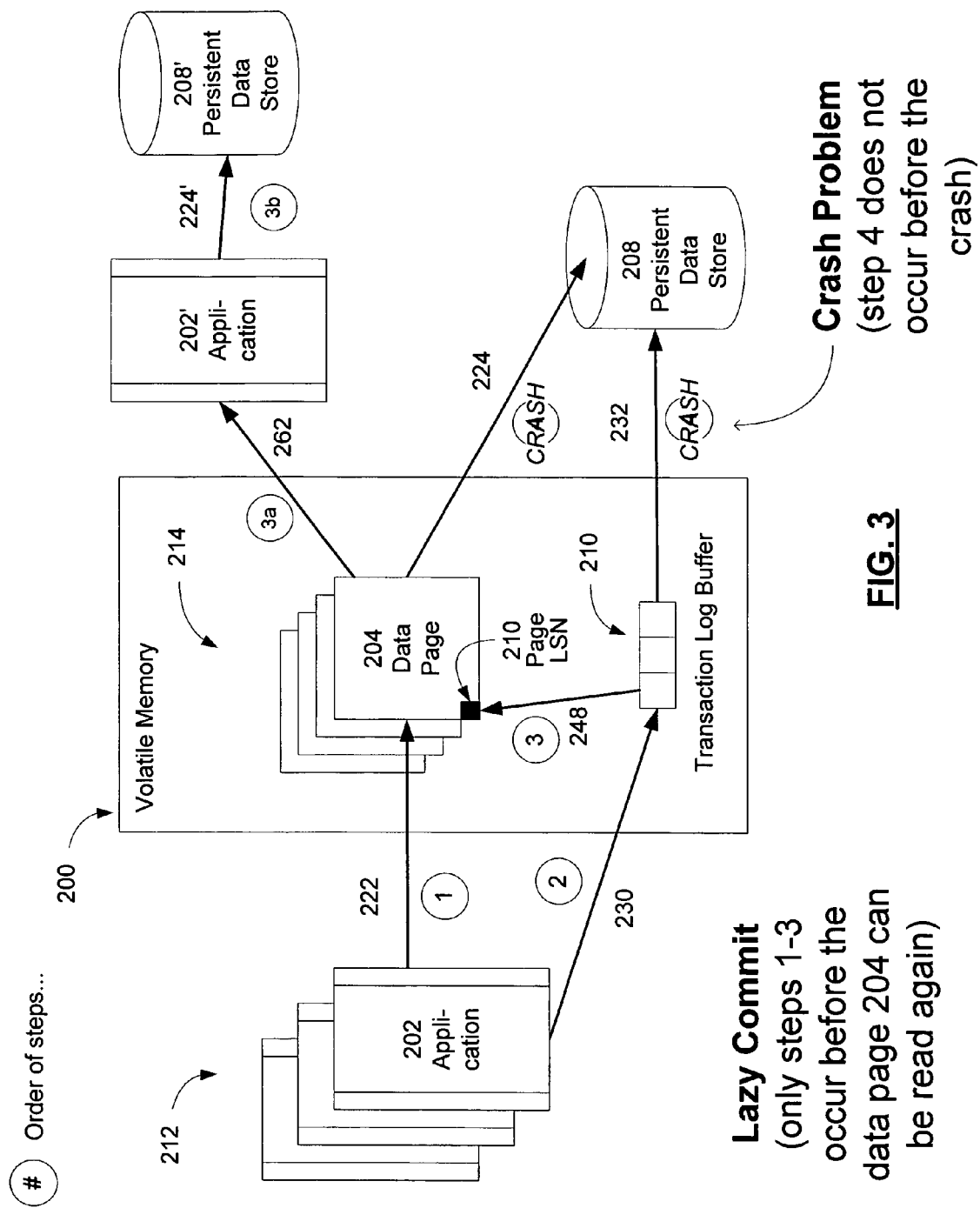
FIG. 3 is a block diagram that illustrates an alternative to the careful write approach using a "lazy commit" strategy.

For example, and in reference to FIG. 3, one such inconsistency that can arise is as follows: An application 202 indicates to the data manager to perform lazy commit of a transaction, and thus the commit 232 (step 4) does not occur before other applications are allowed to access the data in the changed data page 204. Another application 202' then reads 262 the data on the modified data page 202 (step 3a) and writes 224' that data to a second persistent data store 208' (step 3b). If a system crash occurs at this point (before steps 4 and 5 as shown), the commit log record of the transaction will not have been written 232 to the transaction log in the persistent data store, and thus all the changes made as part of transaction would be lost. However, it is possible that the transaction for the second application 202' in the second data store 208' may have durably committed, and this would lead to an inconsistency where the changes are present in the second data store 208' but are missing from the first data store 208.

What is missing in the art is an effective and efficient means by which an application in a system that allows lazy-commits to make a "durable read" of data (that is, read data that is both committed and logged to the data store 208). While certain inefficient means do exist (such as flushing all commit logs and/or suspending all lazy commit transactions whenever a durable read application is processing), these techniques are inadequate and the various embodiments of the present invention provide an alternative that enables a system to gain most of the benefits of using a lazy commit approach while also providing a durable read capability.

Durable Read

Figure 4:
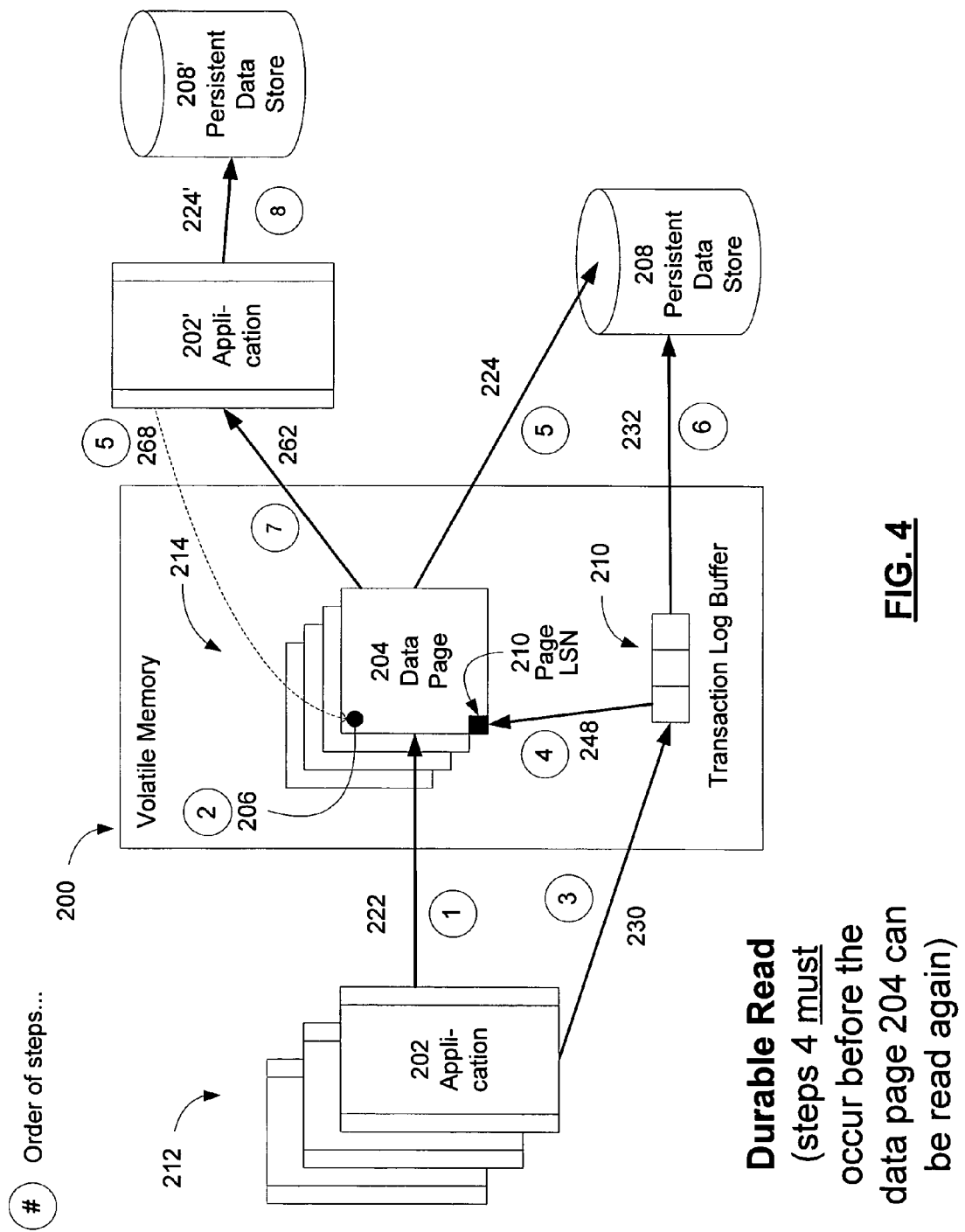
FIG. 4 is a block diagrams that illustrates the method of various embodiments of the present invention to provide a durable read capability in a system that permits lazy commit transactions.

In one embodiment of the present invention, and as illustrated in FIG. 4, a "lazy commit" application 202 makes changes 222 to a data page 204 (step 1) and marks 206 the data page 204 as potentially "not durable" (step 2). This can be achieved by, for example, marking a single bit reserved for this purpose on the page, among other diverse methodologies. The changed data page 204 is not immediately written to the persistent data store 208 but a log entry 230 is made to the transaction log buffer 210 describing this change (step 3) and the Page LSN 210 is also written 248 to the data page 204 (step 4) as described in the background section above. When the application requests the transaction to be committed, a commit log record is written to the transaction log buffer 210 but the transaction log buffers 210 are not flushed to the transaction log in the persistent data store 208 as described in the Lazy commit section above. The application 202 continues its processing under the assumption that the transaction is committed and will become durable at some point in time in future (commit log record written to the persistent data store 208).

Given this present state, a second application 202' seeking to obtain durable data from the changed data page 204 first determines 268 if the data page 204 is marked 206 (step 5) which, in this case, it is (and therefore potentially has non-durable data). The application 202' (directly, via the lazy commit application 202, via the transaction manager, or otherwise) causes the transaction log buffers 210 to immediately flush 232 to the data store 208 so that the commit log entry that pertains to the lazy commit transaction becomes a durable log entry in the data store 208 (step 6) and unmarks the data page (not shown). The application 204' can then read 262 the data from the data page 204 (step 7) and store 224' said data in its data store 208' (step 8). Of course, flushing (step 6) is not required if the data on this page has already been guaranteed durable by another durable read application. The method for doing that is demonstrated in FIG. 6 and is described later in this document.

In general, if the lazy commit transaction that modified this data page has not yet committed, actions are taken to ensure that whenever that transaction commits it flushes the commit log record to the transaction log in the persistent data store (that is, it performs the durable commit and not the lazy commit). One of the ways this can be done is by increasing a store-wide variable called "DurableCommitLSN" to the PageLSN of this page. Whenever a lazy commit transaction is commited, the BeginLSN of that transaction is compared to the DurableCommitLSN and if the BeginLSN of this transaction is less than the DurableCommitLSN, then, this transaction might have modified the data page in question, and hence, flushes its commit log record to the transaction log in the durable data store D. If a second application is reading the same row that a first application has modified, the second application has to wait, after setting DurableCommitLSN, for the first application to commit and release locks before it can read the row.

The modified data page is thus guaranteed to have changes that are durable and the data, now durable, is read from the data page by the durable read application. The data manager or the applications store the information that this data page contains durable data so that any application that intends to do durable read for this page at any time in future, does not have to flush the transaction log buffers. Two of the ways in which this can be achieved is as follows:

1. The bit on the page that is used to mark this page as potentially containing non-durable data can be cleared. On some systems, doing it using the method above might have some undesirable performance consequences. For example, a reader typically acquires read latch on the page. If the reader were to clear this bit, it would have to acquire an exclusive latch and mark the page dirty. That would reduce concurrency and increase the number of I/O's in the system.
2. A value "DurableReadLSN" is maintained by the system. This value indicates that all data pages with pageLSN<DurableReadLSN have only durable data. Whenever a durable read application takes actions to make data on a data page durable, it can increment the DurableReadLSN to the pageLSN of the page that was made durable. Subsequent durable reads by applications compare the DurableReadLSN and pageLSN and take actions to make the data page durable only if the pageLSN>DurableReadLSN. This method has the problem of the marking bit on the page never getting cleared. This problem is resolved by comparing the pageLSN of every page that is written to the persistent data store with the DurableReadLSN. If the pageLSN<DurableReadLSN, then the bit can be cleared just before writing the data page to the persistent data store.

In various embodiments of the present invention, any or all of the actions described herein may be conducted by the application itself, by another application, by the system manager, or by another means, and nothing herein is intended to limit execution of each step in the methodologies to any particular component. With this in mind, one embodiment of the present invention where actions are performed by the transaction manager is herein described.

Figure 5:
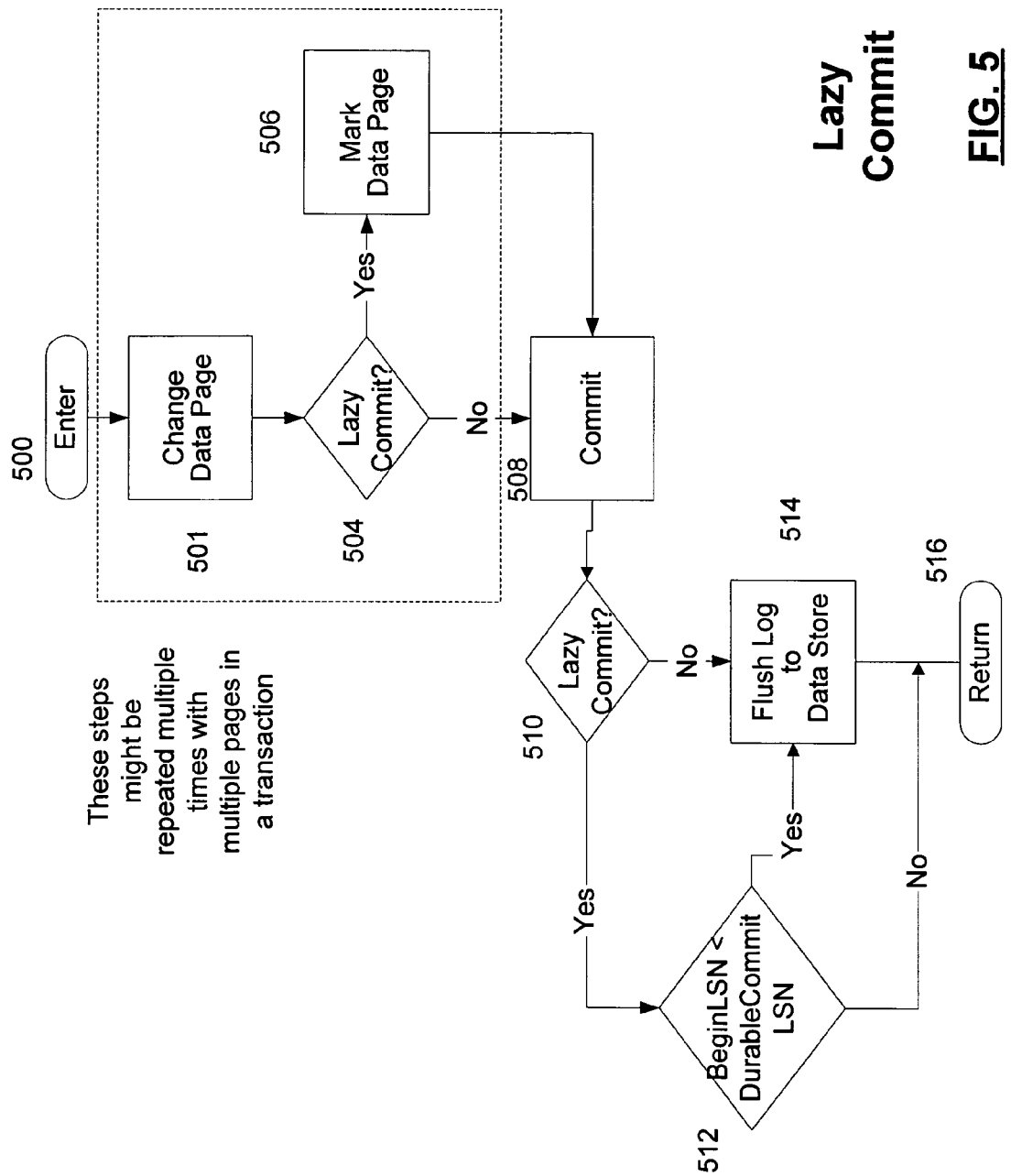
FIG. 5 is a flowchart illustrating the method by which data pages are marked as "not durable" by a lazy commit transaction.

Referring to FIG. 5, a transaction (lazy commit or durable commit) is performed upon entry 500 wherein, at initial step 501, changes are made to the subject data page in memory. At step 504, the transaction manager determines whether the transaction is a lazy commit transaction and, if so, at step 506, the transaction manager marks the data page (to indicate that it is not durable). The steps 501 to 506 might be repeated multiple times with different subject data pages within the same transaction. At step 508, the application requests the transaction to be committed. The transaction manager determines whether this is a lazy commit transaction 510. If it is, the commit log record is written to the transaction log buffer but the buffer is not flushed to the persistent data store. If the transaction manager finds that a durable reader has requested this transaction to be durably committed 512 or, if the transaction is not a lazy commit transaction (in which case it is a "durable commit" transaction), the transaction manager immediately flushes the commit log at step 514 and then returns at step 516.

Figure 6:
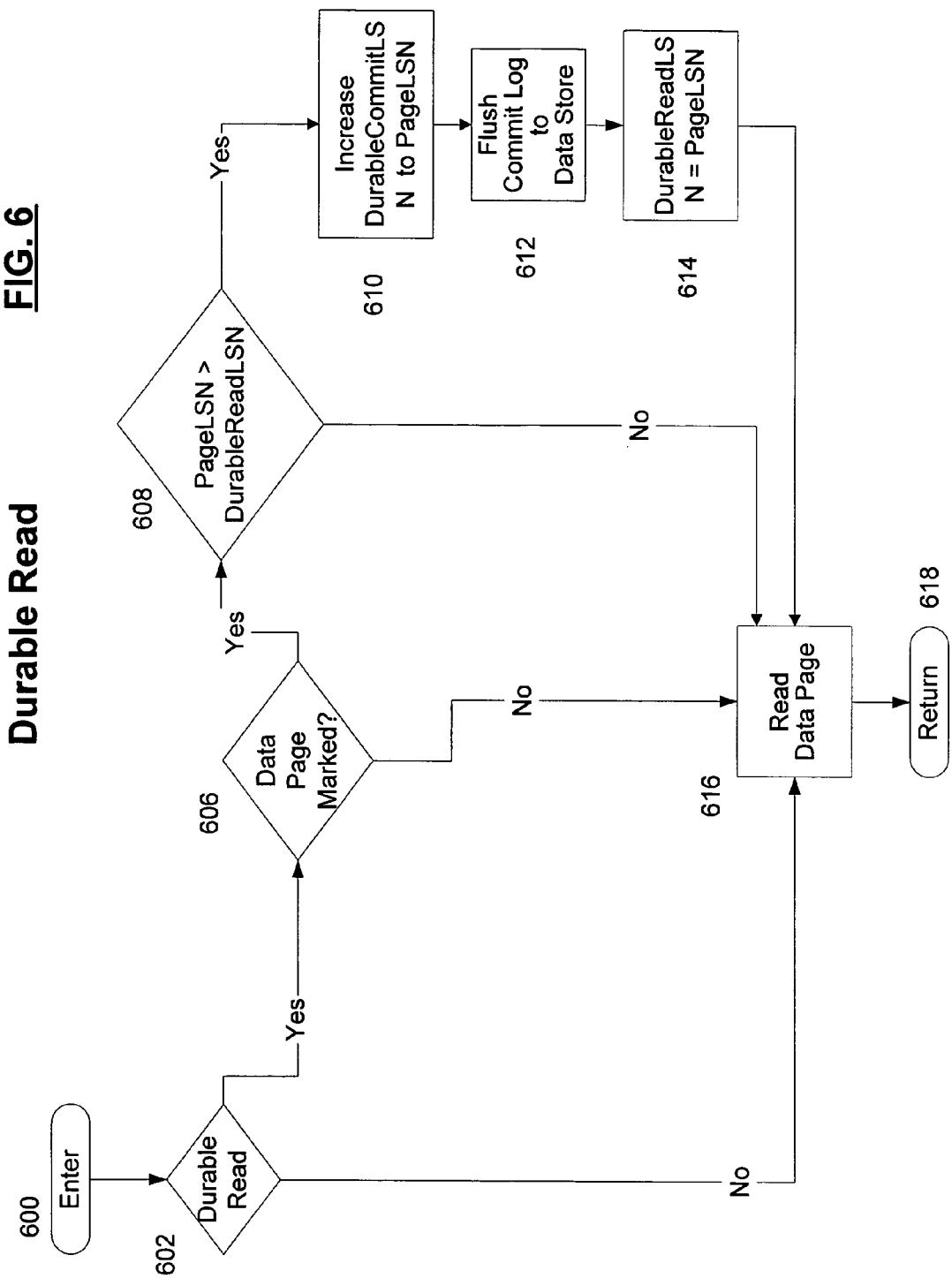
FIG. 6 is a flowchart illustrating the method by which the log is flushed to disk in order to provide an application with the ability to make a durable read of a data page changed by a lazy commit transaction.

Referring to FIG. 6, a read transaction (durable read or non-durable read) is performed upon entry 600 wherein, at initial step 602, the transaction manager determines if the read is to be a durable read and, if so, at step 606, the transaction manager further determines if the data page to be read has been marked as potentially not durable. If the data page is marked, then the transaction manager, at step 608, checks whether the page has already been made durable by another durable reader. If not, it immediately flushes the commit log to the data store at step 612, and takes steps 610 and 614 to indicate to other durable readers that this page is durable. Finally, it reads the data page at 616 and returns at step 618. On the other hand, if the transaction manager determines the read is not a durable read at step 602, or if it is a durable read but the data page is not marked at step 606, in both cases the transaction manager allows the application to immediately read the data page at step 616 and return at step 618.

Figure 7:
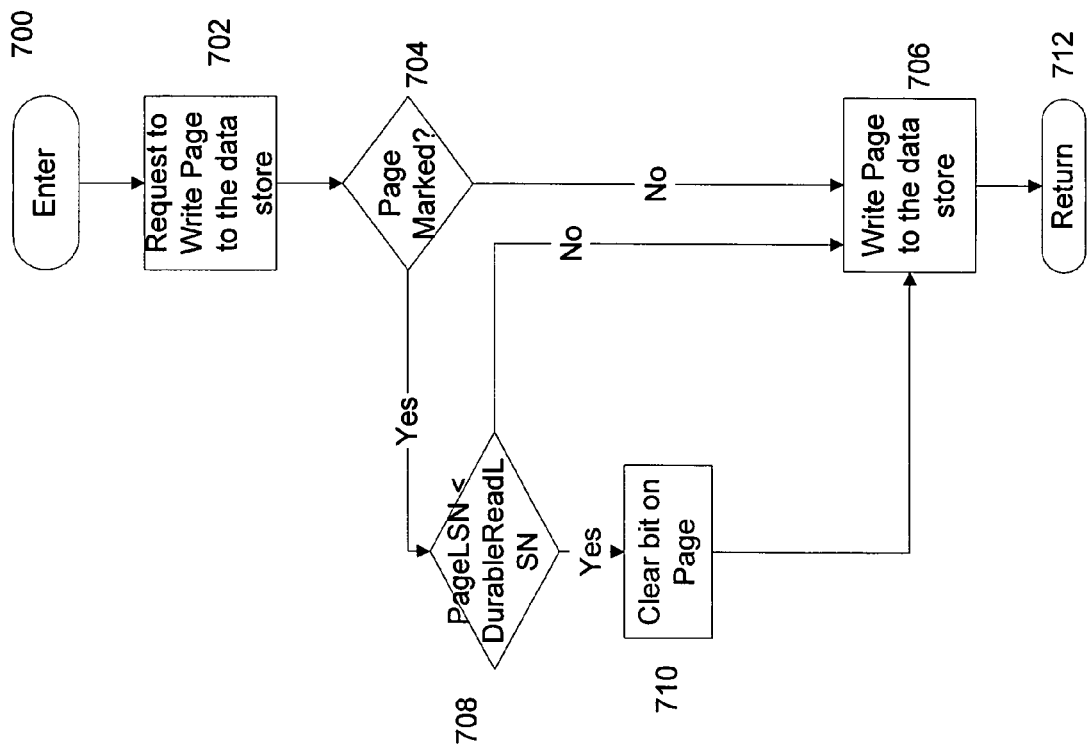
FIG. 7 is a flowchart illustrating the method by which the data pages are unmarked in one embodiment of this invention.

Referring to FIG. 7, at a later point in time, upon entry 700 the data manager is requested 702 that page to be written to the persistent data store. This request might be triggered by an application or a background process or by any other means.

The data manager determines whether the page is marked 704. If it is not, it proceeds to writing the page to the data store 706. If the page is marked, data manager verifies whether the page has already been made durable by another durable read application 708. If it is, then it clears the bit on the page 710 and writes the page to the data store 706 and then returns 712.

CONCLUSION

The various system, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs may be implemented in a high level procedural or object oriented programming language to communicate with a computer system. However, the program (s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the embodiments of the various figures, it is to be understood that other embodiments may be used or modifications and additions may be made to the described embodiment for performing the same function of the present invention without deviating there from. For example, while exemplary embodiments of the invention are described in the context of digital devices emulating the functionality of personal computers, the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

What is claimed is:

1. A computer-implemented method for reading a changed data page from a memory of a computer system, said method comprising:
   making a change to a data page in the memory as a result of a transaction performed by the computer system;
   storing data associated with the change in a transaction log buffer in the memory of the computer system, but not immediately flushing the transaction log buffer to a persistent data store;
   marking the changed data page in the memory to indicate on the changed data page that the transaction log buffer has yet to be flushed to the persistent data store;
   processing a subsequent transaction in which a durable read of at least a portion of the changed data page is to be performed, and before reading the changed data page:
   determining whether the changed data page is marked indicating that the transaction log buffer has yet to be flushed to the persistent data store;
   if the changed data page is marked indicating that the transaction log buffer has yet to be flushed to the persistent data store, flushing the transaction log buffer to the persistent data store prior to the changed data page being read;
   unmarking the changed data page when the transaction log buffer is flushed; and
   reading an unmarked data page as part of a read operation that uses data that has been stored in the persistent data store, without first flushing said transaction log buffer.

2. The method of claim 1 wherein marking the changed data page comprises writing a value of a bit associated with said changed data page.

3. The method of claim 2 wherein the bit is stored in said changed data page.

4. The method of claim 2 wherein the bit is stored in a reference table.

5. The method of claim 1 wherein marking the changed data page comprises recording, in a reference location associated with said changed data page, a copy of a log sequence number from said transaction log buffer and corresponding to the change to the data page.

6. The method of claim 5 wherein said copy of the log sequence number is stored in said changed data page.

7. The method of claim 5 wherein said copy of the log sequence number is stored in a reference table.

8. The method of claim 5 wherein the copy of the log sequence number is used to identify a transaction in order to cause said transaction to effect the flushing of the transaction log buffer.

9. A computer-readable storage medium having computer-readable instructions for reading a changed data page in a memory of a computer system, said computer-readable instructions comprising instructions for:
   making a change to a data page in the memory as a result of a transaction performed by the computer system;
   storing data associated with the change in a transaction log buffer in the memory of the computer system, but not immediately flushing the transaction log buffer to a persistent data store;
   marking the changed data page in the memory to indicate on the changed data page that the transaction log buffer has yet to be flushed to the persistent data store;
   processing a subsequent transaction in which a durable read of at least a portion of the changed data page is to be performed, and before reading the changed data page:

determining whether the changed data page is marked indicating that the transaction log buffer has yet to be flushed to the persistent data store;

if the changed data page is marked indicating that the transaction log buffer has yet to be flushed to the persistent data store, flushing the transaction log buffer to the persistent data store prior to the changed data page being read to ensure data consistency in the event of a system interruption;

unmarking the changed data page when the transaction log buffer is flushed; and reading an unmarked data page as part of a read operation that uses data that has been stored in the persistent data store, without first flushing said transaction log buffer.

10. The computer-readable medium of claim 9 wherein the instructions for marking the changed data page further comprises instructions for changing a value of a bit associated with said changed data page.

11. The computer-readable medium of claim 10 further comprising instructions for the bit to be stored in said changed data page.

12. The computer-readable medium of claim 10 further comprising instructions for the bit to be stored in a reference table.

13. The computer-readable medium of claim 9 wherein the instructions for marking the changed data page further comprises instructions for recording a copy of a log sequence number, from said transaction log buffer and corresponding to the change to the data page, in a reference location associated with said changed data page.

14. The computer-readable medium of claim 13 further comprising instructions for said copy of the log sequence number to be stored in said changed data page.

15. The computer-readable medium of claim 13 further comprising instructions for said copy of the log sequence number to be stored in a reference table.

16. The computer-readable medium of claim 13 further comprising instructions for the copy of the log sequence number to be used to identify a transaction in order to cause said transaction to effect the flushing of the transaction log buffer.

17. A computer system, said computer system comprising:
a processing unit;
a memory;
a persistent data store;
a plurality of data pages stored in the memory; and
a transaction log buffer stored in the memory wherein when the processing unit changes one of the plurality of data pages while performing a transaction, the processing unit stores data associated with the change in the transaction log buffer, but does not immediately flush the transaction log buffer to the persistent data store, and marks the changed data page to indicate on the changed data page that the transaction log buffer containing said data associated with the change has yet to be flushed to the persistent data store;

and wherein when the processing unit thereafter performs a subsequent transaction in which a durable read of at least a portion of the changed data page is to be performed, the processing unit, before reading the changed data page:

determines whether the changed data page is marked indicating that the transaction log buffer has yet to be flushed to the persistent data store;

if the changed data page is marked indicating that the transaction log buffer has yet to be flushed to the persistent data store, flushes the transaction log to the persistent data store prior to the changed data page being read to ensure data consistency in the event of a system interruption; and unmarks the changed data page when the transaction log buffer is flushed, and wherein the processing unit reads an unmarked data page as part of a read operation that uses data that has been stored in the persistent data store, without first flushing said transaction log buffer.

18. The system of claim 17 wherein the plurality of data pages each comprise a bit that is changed when said respective data page is modified by a transaction.

19. The system of claim 18 wherein each bit is stored in said respective data page.

20. The system of claim 18 wherein each bit is stored in a reference table.

21. The system of claim 17, wherein the processing unit records a copy of a log sequence number, from said transaction log buffer and corresponding to said modification of said data page by a transaction, in a reference location associated with said data page when said changed data page is marked.

22. The system of claim 21 wherein the processing unit uses the copy of the log sequence number to identify the transaction in order to cause said transaction to effect flushing of said transaction log buffer and unmarking said changed data page when said associated transaction log buffer is flushed.

* * * * *